3,248,416
METHOD OF PREPARING HIGH MOLECULAR
WEIGHT POLYCARBONATES
Henry C. Stevens, Akron, Ohio, assignor to Pittsburgh Plate Glass Company, Pittsburgh, Pa., a corporation of Pennsylvania
No Drawing. Continuation of application Ser. No. 758,614, Sept. 2, 1958. This application Jan. 16, 1963, Ser. No. 251,771
9 Claims. (Cl. 260—463)

This application is a continuation of application Serial No. 758,614, filed September 2, 1958, now abandoned, which application is a continuation-in-part of my application Serial No. 614,070, filed October 5, 1956, now abandoned.

The present invention deals with a novel process for preparing higher molecular weight polycarbonates, especially polycarbonates having terminal hydroxyl groups and molecular weights of 700 to 5000. It more particularly deals with the preparation of these polycarbonates from a cyclic carbonate and a 1,2 epoxide.

It now has been found that cyclic carbonates such as ethylene carbonate and 1,2 epoxides typified by ethylene oxide may be employed to prepare high molecular weight polycarbonates by heating a mixture thereof which includes from 0.01 to 0.2 mole and preferably 0.02 to 0.1 mole of an organic compound having two or more active hydrogens such as polyhydric alcohol per mole of cyclic carbonate above 100° C. at superatmospheric pressure in the presence of a base catalyst. These polycarbonates as a rule range from 700 to 5000 in molecular weight and typically have hydroxyl numbers of 20 or 30 to 150, notably 40 to 105. These are usually light to dark amber colored syrupy liquids. Some are waxy solids.

Inasmuch as reagents such as ethylene carbonate and ethylene oxide are inexpensive, this process offers a low cost means for achieving valued high molecular weight polycarbonates.

High molecular weight polycarbonates hereby prepared are comprised principally of a multiplicity of carbonate and glycol residues terminated by hydroxyl groups. When ethylene carbonate and ethylene oxide constitute the reactants, the resulting polycarbonate may be viewed as having the following structure:

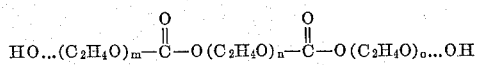

wherein $m$, $n$, and $o$ are whole positive integers of 1 or greater, but not normally greater than 8. Usually subscripts $m$, $n$, and $o$, etc. represent varying values giving a certain degree of randomness to the polymeric material. Corresponding polycarbonates are provided having residues between the carbonate groups

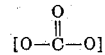

derived of the respective epoxides and cyclic carbonates which are reacted. These polycarbonates are essentially linear in character; that is, they have little cross-linking and three dimensional configuration.

These polycarbonates by virtue of their terminal hydroxyl groups react with carboxylic acids. When condensed with polycarboxylic acids, especially dicarboxylic acids including phthalic, adipic, succinic, maleic and fumaric acids, alkyd type resins result. Such alkyd resins find use as molding powders, laminating resins, coating agents for wood and metals such as iron and steel, coating agents for woven fibrous materials such as cotton, rayon, wool, and are capable of protectively covering sheet-like materials such as glass, polyethylene sheets, etc.

Polycarbonates hereby prepared react with isocyanates and form urethanes. With polyisocyanates such as toluene diisocyanate, polyurethanes are prepared. These polyurethanes are rubbery in character and serve as alternatives for natural and other synthetic rubbers. Polyurethane foams prepared by reaction of these polycarbonates and polyisocyanates in the presence of minor quantities of water or other foaming agents are valuable products. The foams may be either rigid or elastic foams, depending upon whether a cross-linking agent such as glycerol or other trihydric component is included to impart the rigidity. Such elastic foams serve as crash pads and upholstery pillows. Rigid foams are used as insulating materials in aircraft, for protecting heating and cooling ducts and the like.

In performance of this invention, a cyclic carbonate such as ethylene carbonate and a 1,2 epoxide typified by ethylene oxide are chemically combined to provide high molecular weight polycarbonates by heating a mixture of from 1 to 5 moles of the 1,2 epoxide per mole of the cyclic carbonate which contains 0.01 to 0.2 mole of polyhydric alcohol (or other organic compound having at least 2 active hydrogens) per mole of cyclic carbonate at temperatures from 100° C. to 200° C. or higher in the presence of a base catalyst such as potassium carbonate. Superatmospheric pressures above 100 pounds per square inch are employed. Pressures above atmospheric and generally between 200 and 2000 pounds per square inch gauge are most applicable. Higher pressures, although useful, add to the cost of operation and hence not normally desirable.

At the employed temperatures the reactants are gaseous. In a batch process, these gases are charged to a reactor capable of withstanding operative pressures, such as an autoclave. Superatmospheric pressures of 200 pounds per square inch of 2000 pounds per square inch are imposed on the contents of the reactor, usually as autogenously generated pressure. As the reaction proceeds, e.g., as reactants are consumed and polycarbonates formed, a noticeable decrease in the pressure occurs. During the latter stages, pressure may increase somewhat above the minimum pressure observed during the reaction. Often, the final pressure may drop to essentially atmospheric pressure. Other times, the pressure in the autoclave at the conclusion of the process under batchwise operation is several hundred pounds per square inch gauge and may on occasion be near the initial maximum pressure, depending upon the extent of the conversion of cyclic carbonate and 1,2 epoxide and the precise temperature.

Operating by continuous practices, a prescribed set of temperature and pressure conditions are established and maintained in the reactor. Hence, the superatmospheric pressure in such reactor is essentially constant, usually from 500 to 1500 pounds per square inch gauge. The temperature also will be relatively constant.

Effective reaction of the cyclic carbonate and 1,2 epoxide involves base catalysis, e.g. the presence of a catalytic concentration of a base catalyst. Base catalysts refer to a recognized class of catalytic materials which include both inorganic and organic compounds. Illustrative inorganic compounds include alkali carbonates such as sodium, potassium, magnesium and calcium carbonates, alkali hydroxides such as sodium hydroxide, potassium hydroxide and calcium hydroxide and bicarbonates such as sodium bicarbonate. Tertiary amines are the most prominent of the organic base catalysts. Tertiary amines include trimethyl amine, triethyl amine and tripropyl amine or other aliphatic amines. Cyclic amines such as N-methylmorpholine and pyridine also are included.

Catalyst concentration varies. For practical purposes, it is restricted to the relatively low concentrations. Typical concentrations are from 0.01 to 5 percent catalyst by weight of the cyclic carbonate and 1,2 epoxide. It will be appreciated, however, that higher catalyst concentrations are effective.

Important to the formation of polycarbonates from cyclic carbonates and 1,2 epoxides is the inclusion in the reaction medium of 0.01 to 0.2 mole of polyhydric alcohol or other organic compound having 2 or more active hydrogens per mole of cyclic carbonate. The polyhydric alcohol or other organic compound having 2 or more active hydrogens functions as the chemical instrumentality by which the polycarbonate formation is made possible.

Among the organic compounds having 2 or more active hydrogens are the polyhydric alcohols containing 2 to 4 hydroxyl groups. Dihydric alcohols are especially effective. Glycol and polyglycols of the formula

HO—R—OH wherein R is an alkylene or polyalkylene ether are used with most frequence. Such glycols include dimethylene glycol, tetramethylene glycol, ethylene glycol, diethylene glycol, triethylene glycol, propylene glycol, dipropylene glycol and the like glycols having no more than 10 carbon atoms and a maximum of 4 ether groups. Polyhydric alcohols such as triols like glycerol, and more preferably trimethylolethane, trimethylolpropane and tetrols illustrated by pentaerythritol are useful, especially when a three-dimension high molecular polycarbonate is desired. Polyhydric alcohols of more than 2 hydroxyl groups favor cross-linking and give rise to three dimension products. The polyhydric alcohol need not necessarily be included as such in the reaction medium, but may be generated in situ, as by addition of water which upon reaction with 1,2 epoxide, will provide polyhydric alcohol. Also aromatic diols such as catechol, bisphenols, the xylene diols and cycloaliphatic diols such as 1,3 dihydroxycyclopentane are contemplated.

Other organic compounds which contain 2 or more, usually from 2 to 4 active hydrogens may be used. Active hydrogen as herein intended refers to a hydrogen of the type directly linked to an oxygen, sulfur or nitrogen atom. Thus, organic compounds containing 2 or more active hydrogens by virtue of having 2 or more hydroxyl groups, non-tertiary amino groups, mercapto groups, carboxylic groups and carbamate groups or combinations thereof are of use.

Polyamines, especially diamines including ethylenediamine, trimethylenediamine, tetramethylenediamine, pentamethylenediamine, hexamethylenediamine and the like are useful organics having two active hydrogens each linked to a different nitrogen. Diamines such as piperazine and the like wherein each of the two nitrogens have but one hydrogen linked thereto are preferred. Also valuable as organic compounds having 2 or more active hydrogens are the mercaptans such as 1,2-ethanedithiol and other mercaptans having 2 or more SH groups corresponding to the enumerated polyhydric alcohols. Allylol amines such as ethanol amine and diethanol amine are illustrative of organics having at least 2 active hydrogens provided by different groups, e.g. amino and hydroxyl groups.

The precise concentration of polyhydric alcohol within the specified range may be varied according to the desired chain length of a linear polycarbonate. Thus, using polyhydric alcohol in the lower portion of the range will provide the higher molecular weight polycarbonates. With concentrations in the upper portion of the range, polycarbonates of lower molecular weights are the result.

The following example illustrates the manner in which this invention may be practiced:

*Example I*

A mixture of 49.0 grams (1.11 moles) of ethylene oxide, 22.0 grams (0.25 mole) of ethylene carbonate, 0.1 grams of potassium carbonate and 3.1 grams (0.05 mole) of ethylene glycol was heated to 150° C. for 12 hours in a closed reaction vessel. An initial pressure of at least 300 pounds per square inch gauge was developed, and after 12 hours the pressure dropped to 100 pounds per square inch gauge.

The crude reaction mixture contained a small amount of ethylene carbonate. Upon purification of the crude by vacuum distillation, 59.5 grams of polycarbonate was obtained. The polycarbonate had a hydroxyl number of 94, an average molecular weight of 1200 and contained 9 percent $CO_2$.

*Example II*

Example I is duplicated using 0.05 mole of piperazine in lieu of ethylene glycol to obtain a high molecular weight polycarbonate.

*Example III*

Example I is duplicated using in lieu of ethylene glycol 0.05 mole of 1,2-ethanedithiol to realize a high molecular weight polycarbonate.

Practice of the present process and the consequent production of high molecular weight polycarbonates is not restricted to ethylene oxide but may include other 1,2 epoxides. By a 1,2 epoxide, a compound having a

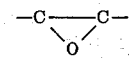

group is intended. These compounds are sometimes referred to as oxiranes. Polycarbonates are produced with greatest facility using olefinically saturated aliphatic 1,2 epoxides such as the alkylene oxides, ethylene oxide, propylene oxide, butylene oxide or like 1,2 epoxides containing up to and including 6 carbon atoms in their longest carbon chain. However, epoxides such as 1,2 butadiene epoxide, cyclohexene oxide, 4-vinyl cyclohexene oxide, butadiene dioxide and 4-vinyl cyclohexene dioxide may be used.

Cyclic carbonates used herein are primarily five-membered cyclic carbonates derived from 1,2 glycols such as alkylene carbonates typified by ethylene carbonate. Thus, useful cyclic alkylene carbonates include 1,2 butylene carbonate, 2,3 butylene carbonate, propylene carbonate, vinyl ethylene carbonate and other such cyclic alkylene carbonates having 3 to 6 (inclusive) carbon atoms. Other cyclic carbonates are useful which contain the radical:

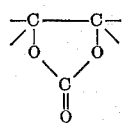

Vinylene carbonate and other such cyclic carbonates in which the ring structure includes a

group such as methyl vinylene carbonate, ethyl vinylene carbonate, propyl vinylene carbonate and dimethyl vinylene carbonate may be herein employed.

The polycarbonate formation is achieved at temperatures above 100° C., and usually at from 150° C. to 250° C., but not at a temperature which causes substantial rupture of the linear polycarbonate. With many polycarbonates produced hereby, temperatures in excess of 220° C. tend to cause rupturing of the polycarbonate, particularly when the polycarbonate is subjected to such elevated temperatures for substantial time periods. By restricting the period of time to below 2 or 3 hours at which the linear polycarbonate is at temperatures in substantial excess of 220° C., the reaction may be performed at temperatures above say 225° C. to 250° C. Normally, the process is conducted at temperatures in the range of 140° C. to 200° C. Reaction periods usually range from 1 or 2 hours to 24 hours or longer.

The polycarbonates often are in admixture with one or more of the raw materials employed in their formation. By fractional distillation under vacuum, the 1,2 epoxides and the cyclic carbonates which may be present can be removed with relative ease. Vacuums on the order of under 50 millimeters of mercury vacuum are most appropriate for this purpose.

Although the present invention has been described with reference to specific details of certain embodiments, it is not intended that the invention be construed as limited thereto except insofar as such limitations appear in the appended claims.

I claim:
1. A method of preparing a high molecular weight polycarbonate which comprises heating with base catalyst present a mixture of a cyclic carbonate having 3 to 6 carbon atoms selected from the group consisting of alkylene and vinylene carbonates and an alkylene 1,2 epoxide containing up to 6 carbon atoms with from 0.01 to 0.2 mole of a dihydric alcohol of the formula HO—R—OH wherein R is a radical selected from the group consisting of alkylene and polyalkylene ether radicals having up to 10 carbon atoms and up to 4 ether linkages per mole of carbonate to above 100° C. and below a temperature at which substantial rupture of the polycarbonate occurs.

2. The method of claim 1 wherein water is employed to generate in situ the dihydric alcohol.

3. A method of preparing a high molecular weight polycarbonate which comprises heating in the presence of a base catalyst a mixture of ethylene carbonate and an alkylene 1,2 epoxide containing up to 6 carbon atoms including from 0.01 to 0.2 mole of a dihydric alcohol of the formula HO—R—OH wherein R is a radical selected from the group consisting of alkylene and polyalkylene ether radicals containing up to 10 carbon atoms and up to 4 ether linkages per mole of carbonate to 100° C. to 250° C. and at super-atmospheric pressure whereby high molecular weight linear polycarbonate is formed.

4. A method of preparing a high molecular weight polycarbonate which comprises heating in the presence of a base catalyst a mixture of ethylene oxide and ethylene carbonate including 0.01 to 0.2 mole of a glycol of the formula HO—R—OH wherein R is selected from the group consisting of alkylene and polyalkylene ether radicals containing up to 10 carbon atoms and up to 4 ether linkages per mole of carbonate to 100° C. to 250° C. and at 200 to 2000 pounds per square inch gauge whereby high molecular weight polycarbonate is formed.

5. The method of claim 4 wherein the glycol is an ethylene glycol.

6. A method of preparing a high molecular weight polycarbonate which comprises heating a mixture of ethylene carbonate and ethylene oxide having 1 to 5 moles of ethylene oxide per mole of ethylene carbonate and containing 0.01 to 0.2 mole of a glycol of the formula HO—R—OH wherein R is a radical selected from the group consisting of alkylene and polyalkylene ether radicals containing up to 10 carbon atoms and up to 4 ether linkages per mole of ethylene carbonate to between 100° C. and 250° C. in the presence of an alkali carbonate base catalyst and at a pressure greater than 200 pounds per square inch whereby to form polycarbonate of 700 to 5000 molecular weight.

7. A method of preparing a high molecular weight polycarbonate which comprises heating with base catalyst present a mixture of a cyclic carbonate having 3 to 6 carbon atoms selected from the group consisting of alkylene and vinylene carbonates and an alkylene 1,2-epoxide of up to 6 carbon atoms with from 0.01 to 0.2 mole of an organic compound selected from a group consisting of dihydric alcohols of the formula HO—R—OH wherein R is a radical selected from the group consisting of alkylene and polyalkylene ether radicals containing up to 10 carbon atoms and up to 4 ether linkages, mercaptans corresponding to said dihydric alcohols and alkylene diamines of 2 to 6 carbon atoms per mole of carbonate to above 100° C. and below a temperature at which substantial rupture of the polycarbonate occurs.

8. The method of claim 7 wherein the dihydric alcohol is 1,2-ethanedithiol.

9. A method of preparing a high molecular weight polycarbonate which comprises heating in the presence of a base catalyst a mixture of ethylene oxide and ethylene carbonate including 0.01 to 0.2 mole of piperazine per mole of ethylene carbonate to between 100° C. and 250° C. and at 200 to 2000 pounds per square inch gauge whereby high molecular weight polycarbonate is formed.

References Cited by the Examiner
UNITED STATES PATENTS

| | | | |
|---|---|---|---|
| 2,210,817 | 8/1940 | Peterson | 260—463 X |
| 2,449,987 | 9/1948 | Gresham | 260—463 X |
| 2,651,657 | 9/1953 | Mikeska et al. | 260—463 |

CHARLES B. PARKER, *Primary Examiner.*